US010967678B2

(12) United States Patent
Clemmer et al.

(10) Patent No.: US 10,967,678 B2
(45) Date of Patent: Apr. 6, 2021

(54) TIRE WITH LAMINATE AND METHOD OF MAKING SAME

(71) Applicant: Bridgestone Americas Tire Operations, LLC, Nashville, TN (US)

(72) Inventors: Kathleen A. Clemmer, Akron, OH (US); John P. Rodak, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 604 days.

(21) Appl. No.: 15/109,776

(22) PCT Filed: Jan. 8, 2015

(86) PCT No.: PCT/US2015/010555
§ 371 (c)(1),
(2) Date: Jul. 5, 2016

(87) PCT Pub. No.: WO2015/108744
PCT Pub. Date: Jul. 23, 2015

(65) Prior Publication Data
US 2016/0318346 A1    Nov. 3, 2016

Related U.S. Application Data

(60) Provisional application No. 61/928,227, filed on Jan. 16, 2014.

(51) Int. Cl.
*B29D 30/58* (2006.01)
*B60C 11/00* (2006.01)
(Continued)

(52) U.S. Cl.
CPC .......... *B60C 11/0041* (2013.01); *B29D 30/58* (2013.01); *B29D 30/66* (2013.01);
(Continued)

(58) Field of Classification Search
CPC ...... B29D 30/54; B29D 30/58; B60C 11/1346
See application file for complete search history.

(56) References Cited

U.S. PATENT DOCUMENTS 2,752,256 A    6/1956   Hargis
2,777,497 A    1/1957   Hildebrant
(Continued)

FOREIGN PATENT DOCUMENTS

CN    103097150    5/2013
DE    29604054     6/1996
(Continued)

OTHER PUBLICATIONS

English machine translation of JP08-025515 (Year: 1996).*
(Continued)

*Primary Examiner* — Robert C Dye (57) ABSTRACT

A method of laminating a vulcanized tire includes providing a vulcanized tire having a circumferential tread and a pair of sidewalls constructed of a base rubber. The method further includes cleaning the circumferential tread, providing a laminate, and forming a plurality of holes in the laminate. The method also includes applying the laminate to at least a portion of one of the circumferential tread and a sidewall of the vulcanized tire. The method further includes applying pressure to the laminate, thereby evacuating air between the laminate and the circumferential tread of the vulcanized tire and curing the laminate.

19 Claims, 7 Drawing Sheets

(51) Int. Cl.
*B60C 11/13* (2006.01)
*B29D 30/66* (2006.01)
*B29D 30/68* (2006.01)
*B60C 13/00* (2006.01)
*B29D 30/72* (2006.01)

(52) U.S. Cl.
CPC ........ *B29D 30/68* (2013.01); *B60C 11/1346* (2013.01); *B60C 13/00* (2013.01); *B29D 2030/582* (2013.01); *B29D 2030/587* (2013.01); *B29D 2030/728* (2013.01); *B60C 2011/0025* (2013.01); *B60C 2013/006* (2013.01)

(56) References Cited

U.S. PATENT DOCUMENTS

| | | | |
|---|---|---|---|
| 3,062,696 | A | 11/1962 | Riehl |
| 3,511,291 | A | 5/1970 | Ragan |
| 3,914,478 | A | 10/1975 | Johansson et al. |
| 3,945,417 | A | 3/1976 | Harrelson, Jr. |
| 3,998,981 | A | 12/1976 | Burkhardt et al. |
| 4,415,013 | A | 11/1983 | Vine |
| 4,616,048 | A | 10/1986 | De Trano et al. |
| 4,704,176 | A | 11/1987 | Botzman |
| 4,902,380 | A | 2/1990 | Olson |
| 5,053,094 | A | 10/1991 | Detwiler |
| 5,275,218 | A * | 1/1994 | Nakayama ........... B29D 30/542 152/209.17 |
| 5,306,130 | A | 4/1994 | King et al. |
| 5,356,997 | A * | 10/1994 | Massie, II ............. C08F 136/08 525/237 |
| 5,840,137 | A | 11/1998 | Futamura |
| 5,891,525 | A | 4/1999 | Chauffour et al. |
| 6,583,210 | B2 | 6/2003 | Zanzig et al. |
| 7,837,778 | B1 | 11/2010 | Ransom |
| 2004/0103966 | A1 | 6/2004 | Boes et al. |
| 2009/0008012 | A1 | 1/2009 | Matsumoto |
| 2010/0024942 | A1 | 2/2010 | Negroni et al. |
| 2011/0214801 | A1 | 9/2011 | Lindsay et al. |

FOREIGN PATENT DOCUMENTS

| | | | |
|---|---|---|---|
| DE | 102007003062 | | 7/2008 |
| EP | 0370664 | | 5/1990 |
| EP | 0370664 | A2 | 5/1990 |
| FR | 1523571 | * | 5/1968 |
| GB | 1503027 | | 3/1978 |
| JP | H01060902 | | 4/1989 |
| JP | H08025515 | | 1/1996 |
| JP | H08175116 | | 7/1996 |
| JP | H08175116 | A | 7/1996 |
| JP | H1081112 | | 3/1998 |
| JP | H1081112 | A | 3/1998 |
| JP | H10272706 | | 10/1998 |
| JP | H10272706 | A | 10/1998 |
| JP | 2005504671 | A | 2/2005 |
| JP | 2006062518 | A | 3/2006 |
| JP | 2008290328 | A | 12/2008 |
| JP | 2011173438 | A | 9/2011 |
| JP | 2012201125 | A | 10/2012 |
| JP | 2013091209 | A | 5/2013 |
| KR | 100297446 | | 11/2001 |
| KR | 20020000241 | | 1/2002 |
| RU | 2176958 | | 12/2001 |
| WO | 8505329 | | 12/1985 |
| WO | 8906670 | | 7/1989 |
| WO | WO 01/43958 | * | 6/2001 |
| WO | 2009057587 | | 5/2009 |

OTHER PUBLICATIONS

English machine translation of JP2008-290328 (Year: 2008).*
English Abstract of JP2005504671A, dated Feb. 17, 2005.
English Abstract of JP2006062518A, dated Mar. 9, 2006.
English Abstract of JP2008290328A, dated Dec. 4, 2008.
English Abstrct of JP2011173438A, dated Sep. 8, 2011.
English Abstrct of JP2012201125A, dated Oct. 22, 2012.
English Abstract of JP2013091209A, dated May 16, 2013.
English Abstract of JPH01060902 not available.
English Abstract of JPH08025515, dated Jan. 30, 1996.
English Abstract of CN103097150, dated May 8, 2013.
English Abstract of WO2009057587, dated May 7, 2009.
English abstract of JPH1081112, dated Mar. 31, 1998.
English abstract of JP08175116, dated on Jul. 9, 1996.
English abstract of KR20020000241, dated Jan. 5, 2002.
English abstract of JPH10272706, dated Oct. 13, 1998.
Machine translation of DE102007003062, dated Jul. 24, 2008.
European search report, dated Aug. 7, 2017.
English Abstract of EP0370664A2, dated May 30, 1990.
English Abstract of JPH08175116A, dated Jul. 9, 1996.
English Abstract of JPH10272706A, dated Oct. 13, 1998.
English Abstract of JPH1081112A, dated Mar. 31, 1998.
International Preliminary Report of Patentability; Corresponding PCT Application No. PCT/US2015/010555 filed Jan. 8, 2015; Authorized Officer Mineko Mohri; Jul. 19, 2016.
International Search Report and Written Opinion; Corresponding PCT Application No. PCT/US2015/010555 filed Jan. 8, 2015; Authorized Officer Chang Ho Lee; Apr. 23, 2015.

* cited by examiner

TIRE WITH LAMINATE AND METHOD OF MAKING SAME

FIELD OF INVENTION

The present disclosure relates to a tire having a laminate disposed thereon and to methods of its preparation. More particularly, the present disclosure relates to a cured tire having a laminate applied thereto.

BACKGROUND

Known tire treads are rubber compositions which contain at least some carbon black reinforcement and are thereby black in color. The rubber of a tread may be selected for its material properties, such as its hardness. As the tread wears, the tire becomes less suitable for driving and must be replaced or retreaded.

SUMMARY OF THE INVENTION

In one embodiment, a tire includes a pair of sidewalls and a circumferential tread constructed of a base rubber. The circumferential tread has a plurality of grooves disposed therein, thereby defining a plurality of tread elements. The tire further includes a polymeric laminate disposed on the circumferential tread. The polymeric laminate covers at least one of the plurality of grooves. The polymeric laminate also covers a top surface of at least one of the plurality of tread elements, and has substantially the same modulus of elasticity as the base rubber.

In another embodiment, a method of applying a laminate to a cured tire includes providing a cured tire having a circumferential tread constructed of a base material. The circumferential tread has a plurality of tread elements, with each of the plurality of tread elements having a top surface and a plurality of side surfaces. The circumferential tread further has a plurality of grooves disposed between the plurality of tread elements. The method also includes providing an uncured laminate and placing the uncured laminate about the circumferential tread of the cured tire, such that the uncured laminate covers at least some of the plurality of tread elements and at least some of the plurality of grooves, wherein the laminate has greater snow traction than the base material. The method further includes stitching the uncured laminate to the cured tire by applying pressure to the uncured laminate and heating the uncured laminate and the cured tire.

In yet another embodiment, a method of laminating a vulcanized tire includes providing a vulcanized tire having a circumferential tread and a pair of sidewalls constructed of a base rubber. The method further includes cleaning the circumferential tread, providing a laminate, and forming a plurality of holes in the laminate. The method also includes applying the laminate to at least a portion of one of the circumferential tread and a sidewall of the vulcanized tire. The method further includes applying pressure to the laminate, thereby evacuating air between the laminate and the circumferential tread of the vulcanized tire and curing the laminate.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. Additionally, components may start or end at different locations than those drawn. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

FIGS. 1-8 show various embodiments of tires having a laminate disposed on at least a portion of an external surface of the tire. The laminate may be rubber, or another polymeric material. In one embodiment, the laminate has a thickness of less than 1.5 millimeters. In one specific embodiment, the laminate has a thickness of between 1.0 to 1.5 millimeters. However, it should be understood that thicker laminates may be employed. The thickness of the laminate may be exaggerated in the drawings for illustrative purposes.

Figure 1:
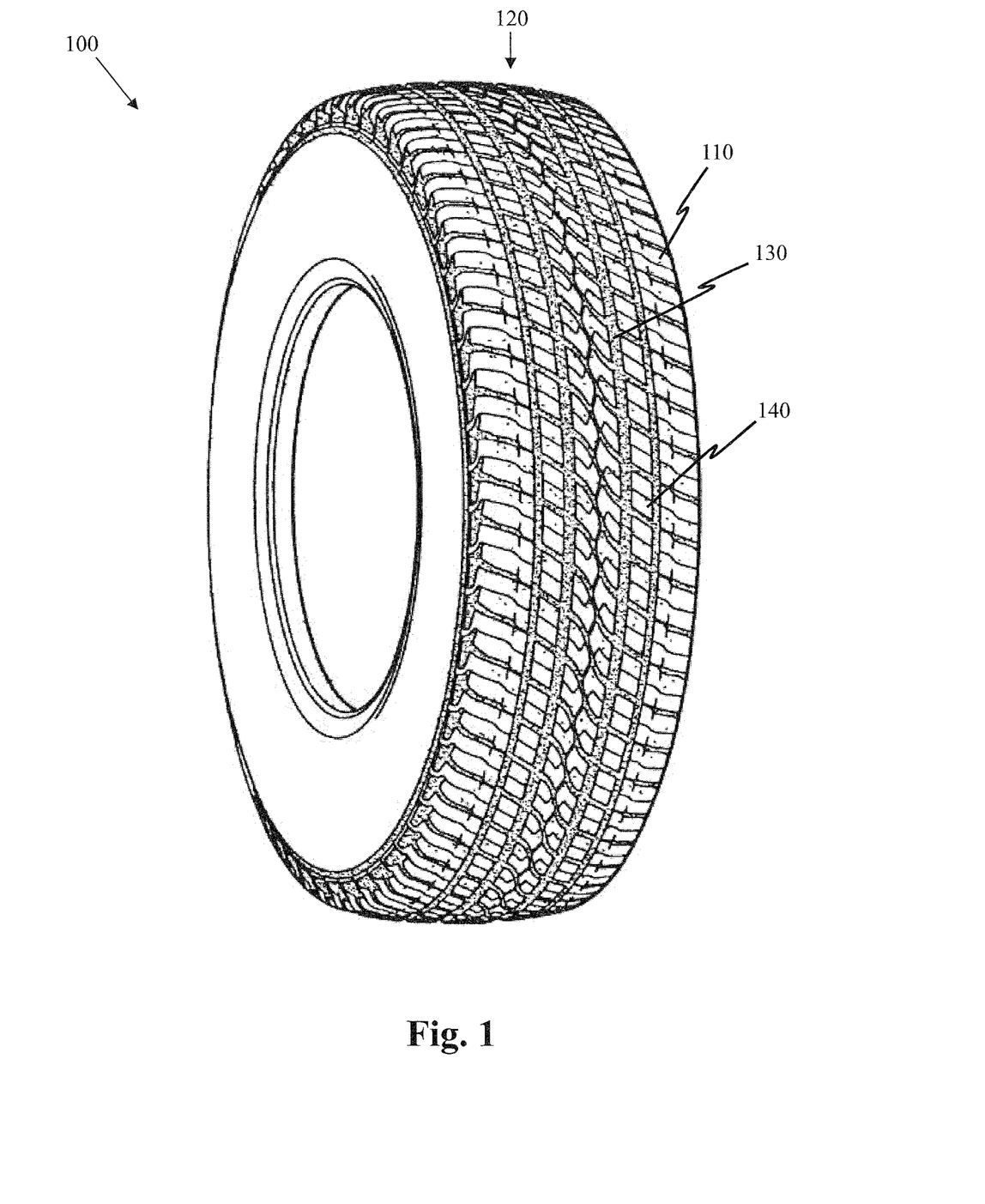
FIG. 1 is a perspective view of one embodiment of a tire having a laminate disposed in grooves of a tread.

FIG. 1 illustrates a perspective view of one embodiment of a tire 100 having a circumferential tread 110 with grooves 120 disposed therein. The tire 100 has a laminate 130 disposed in the grooves 120. In the illustrated embodiment, the circumferential tread 110 includes a plurality of blocks 140. In alternative embodiments (not shown), the tire may include one or more tread elements such as lugs or solid circumferential ribs. It should be understood that the tire may employ any tread design.

Figure 2:
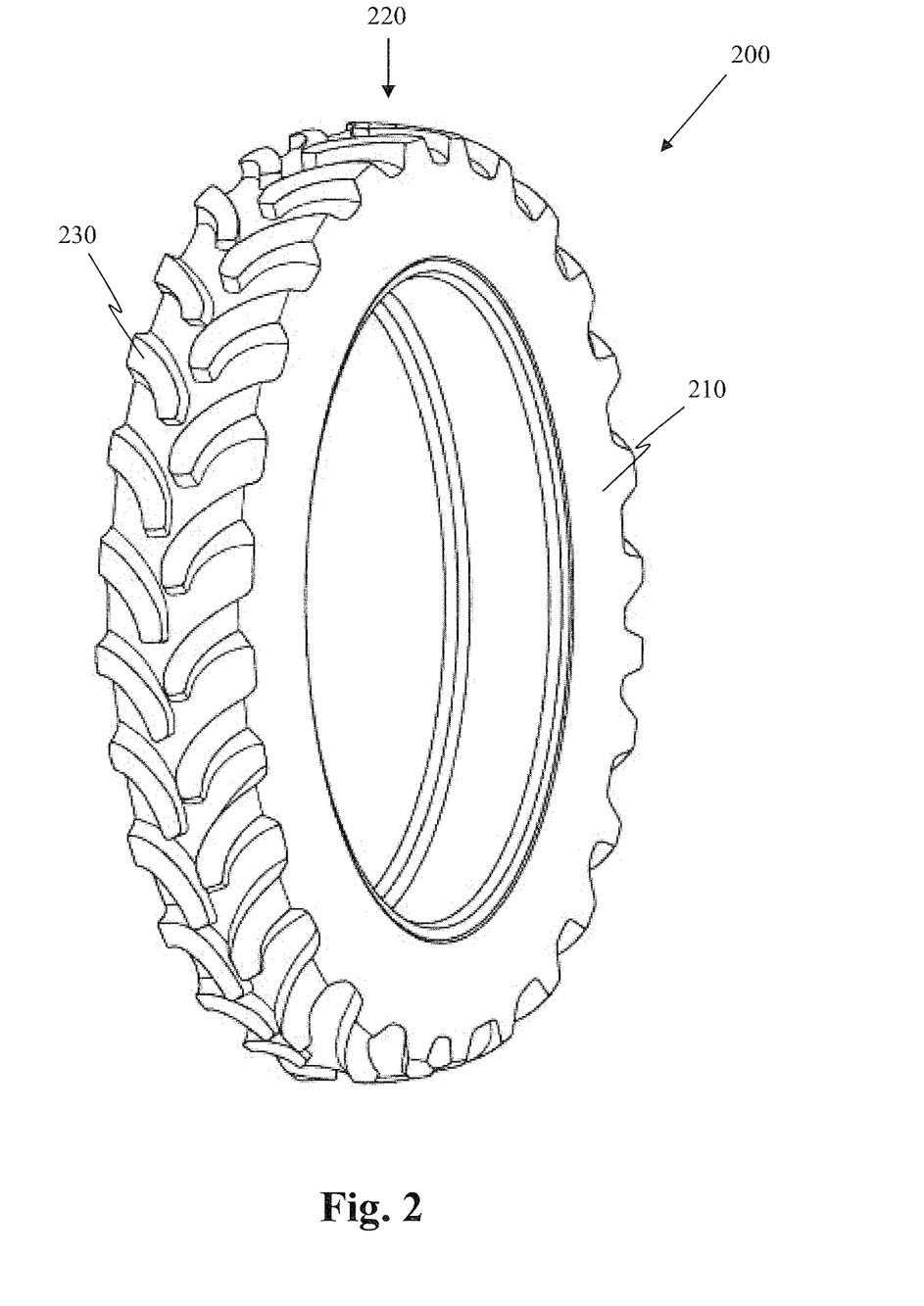
FIG. 2 is a perspective view of an alternative embodiment of a tire having a laminate disposed thereon.

FIG. 2 illustrates a perspective view of an alternative embodiment of a tire 200 having a laminate 210 disposed thereon. In the illustrated embodiment, the laminate 210 covers substantially the entire external surface of the tire. In the illustrated embodiment, tire 200 has a circumferential tread 220 with a plurality of lugs 230. In alternative embodiments (not shown), the tire may include one or more solid circumferential ribs, or one or more blocks. In another alternative embodiment (not shown), the tire may only cover a portion of the surface of the grooves. It should be understood that the tire may employ any tread design.

While FIG. 1 illustrates a tire 100 suitable for a passenger vehicle and FIG. 2 illustrates a tire 200 suitable for an agricultural vehicle, these tires are merely exemplary. It should be understood that the laminates described herein may be employed on tires for any vehicle, including without limitation, bicycles, motorcycles, all-terrain vehicles, cars, trucks, tractors and other agricultural vehicles, mining vehicles, airplanes, and all other wheeled vehicles. The material properties of the laminate may be varied according to the vehicle type, and the expected use of the tire.

Figure 3:
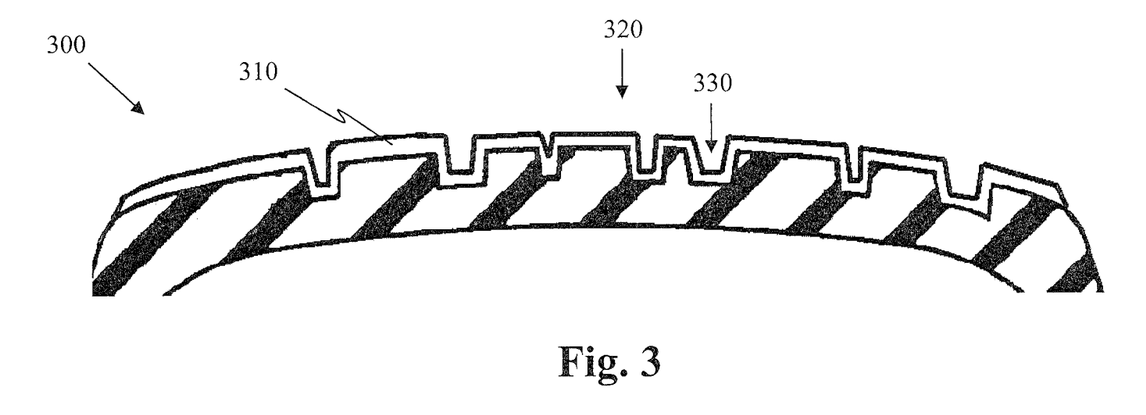
FIG. 3 is a cross-section of one embodiment of a tire having a laminate disposed on a circumferential tread.

FIG. 3 illustrates a cross-section of one embodiment of a tire 300 having a laminate 310 disposed on a circumferential tread 320. The laminate 310 covers both the top surface of the tread 320 and grooves 330 disposed in the tread 320. The laminate 310 may also cover slots, sipes, and other tread elements (not shown).

Figure 4:
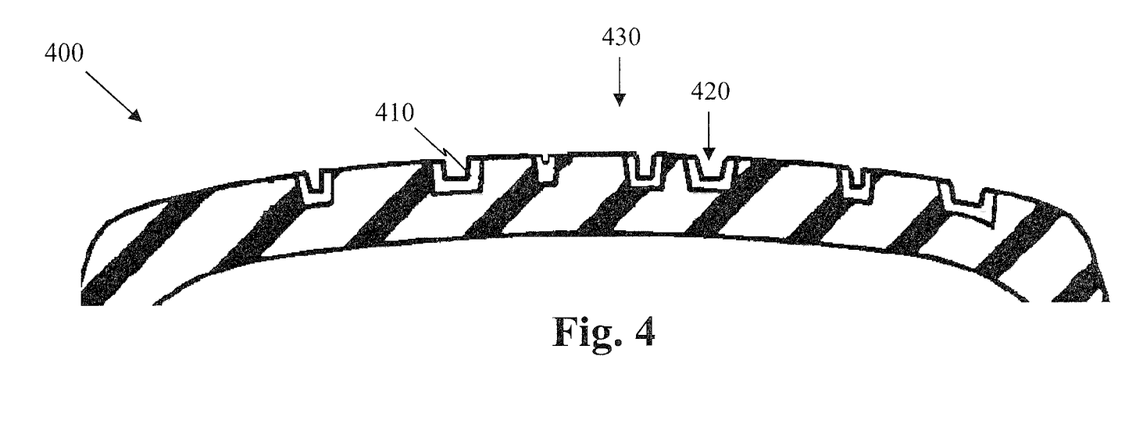
FIG. 4 is a cross-section of one embodiment of a tire having a laminate disposed in grooves of a circumferential tread.

FIG. 4 illustrates a cross-section of one embodiment of a tire 400 having a laminate 410 disposed on the surface of grooves 420 of a circumferential tread 430. The laminate 410 may also cover slots, sipes, and other tread elements (not shown). In the illustrated embodiment, the laminate does not cover the top surface of the circumferential tread 430, i.e. the portion of the circumferential tread that comes into contact with a road or other rolling surface.

In one method of making the tire 400, strips of laminate 410 are placed only in the grooves 420 of the tire 400. In an alternative embodiment, the laminate 410 is first disposed over the entire circumferential tread 430 such that it covers both the top surface of the tread 430 and the grooves 420 disposed therein. The laminate 410 on the top surface of the tread 430 is then buffed off or ground away, using an abrasive grinding material. In such an embodiment, the laminate may be recycled after it is ground off the tire. In another alternative embodiment, the laminate 410 is disposed over the entire circumferential tread 430 of the tire 400, and the laminate 410 on the top surface of the tread 430 is subsequently worn away during use of the tire 400 on a vehicle.

Figure 5:
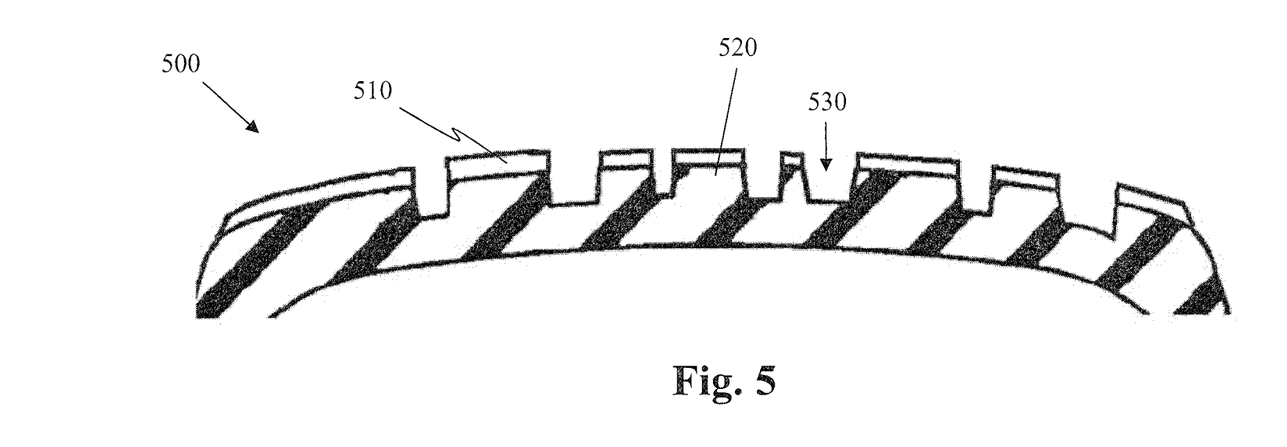
FIG. 5 is a cross-section of one embodiment of a tire having a laminate disposed on a top surface of tread elements of a tire.

FIG. 5 illustrates a cross-section of one embodiment of a tire 500 having a laminate 510 disposed on a top surface of tread elements 520, without extending into the grooves 530 of the tire 500. In the illustrated embodiment, the laminate 510 is disposed on the top surface of each tread element 520. In alternative embodiments (not shown), the laminate is disposed on the top surface of only some of the tread elements.

In one method of making the illustrated tire 500, the tread elements 520 are ribs and a ribbon of laminate is wound around each rib of the tire. In an alternative method, a laminate is cut to the size of each tread element of the tire. In another alternative embodiment, the laminate layer may be in a liquid form, and applied with a spray or a bath. The spray or bath may be applied to any portion of the tire, including, without limitation, those portions shown in FIGS. 1-8. Such methods may be employed where the tread elements are ribs, blocks, lugs, or any other tread element.

Figure 6:
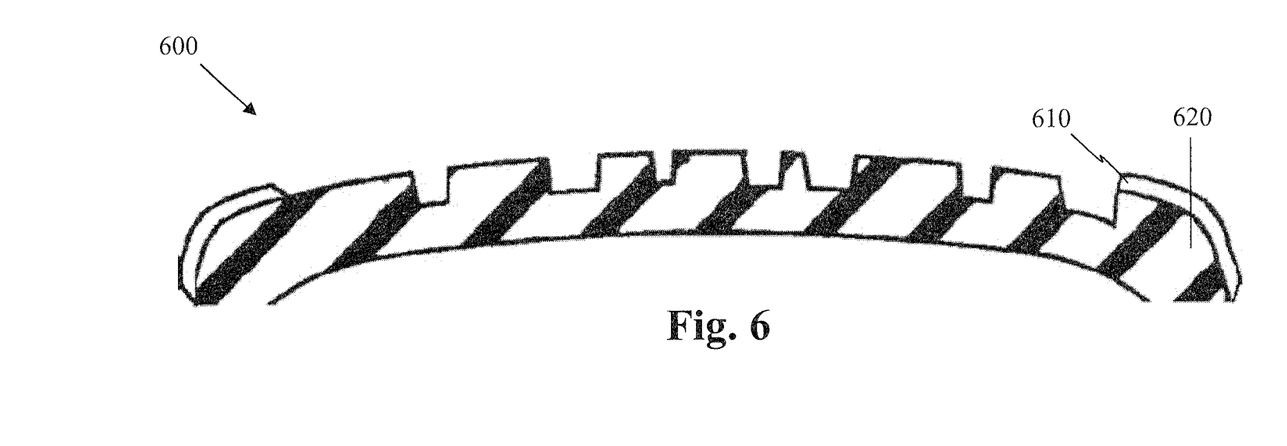
FIG. 6 is a cross-section of one embodiment of a tire having a laminate disposed on shoulders of a tire.

FIG. 6 illustrates a cross-section of one embodiment of a tire 600 having a laminate 610 disposed on each shoulder 620 of the tire 600. In the illustrated embodiment, both shoulders 620 are covered by the laminate 610. In an alternative embodiment (not shown), a laminate is disposed on only one shoulder of the tire.

Figure 7:
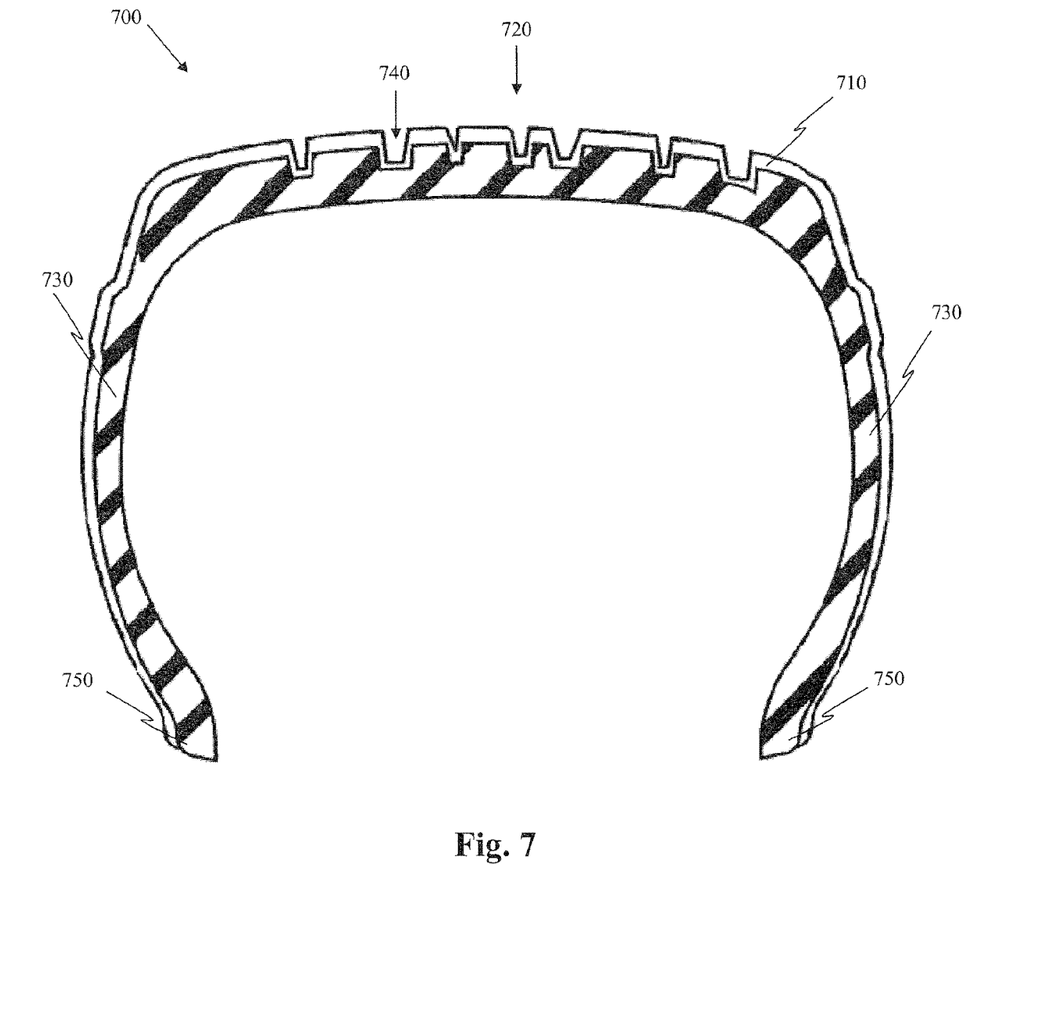
FIG. 7 is a cross-section of one embodiment of a tire having a laminate disposed on a circumferential tread and a pair of sidewalls.

FIG. 7 illustrates a cross-section of one embodiment of a tire 700 having a laminate 710 disposed on a circumferential tread 720 and a pair of sidewalls 730. The laminate 710 covers both the top surface of the tread 720 and the grooves 740 disposed therein. The laminate 710 may also cover slots, sipes, and other tread elements (not shown). In the illustrated embodiment, the laminate 710 extends down each sidewall 730 to the heel 750 of the tire 700. In alternative embodiments (not show), the laminate may only cover a portion of each sidewall. It should be understood that the coverage of each sidewall need not be the same. For example, the laminate may cover an outer sidewall of a tire, but not the inner sidewall of the tire.

While the coverage of the laminate is shown as continuous, it should be understood that gaps may exist. For example, the laminate 710 may be disposed on the surface of grooves 740 of a circumferential tread 720, but not on the top surface of the tread 720 in the same manner shown in FIG. 4. Additionally, portions of the sidewall 730 may be left uncovered or the laminate may be ground away from portions of the sidewall 730.

Figure 8:
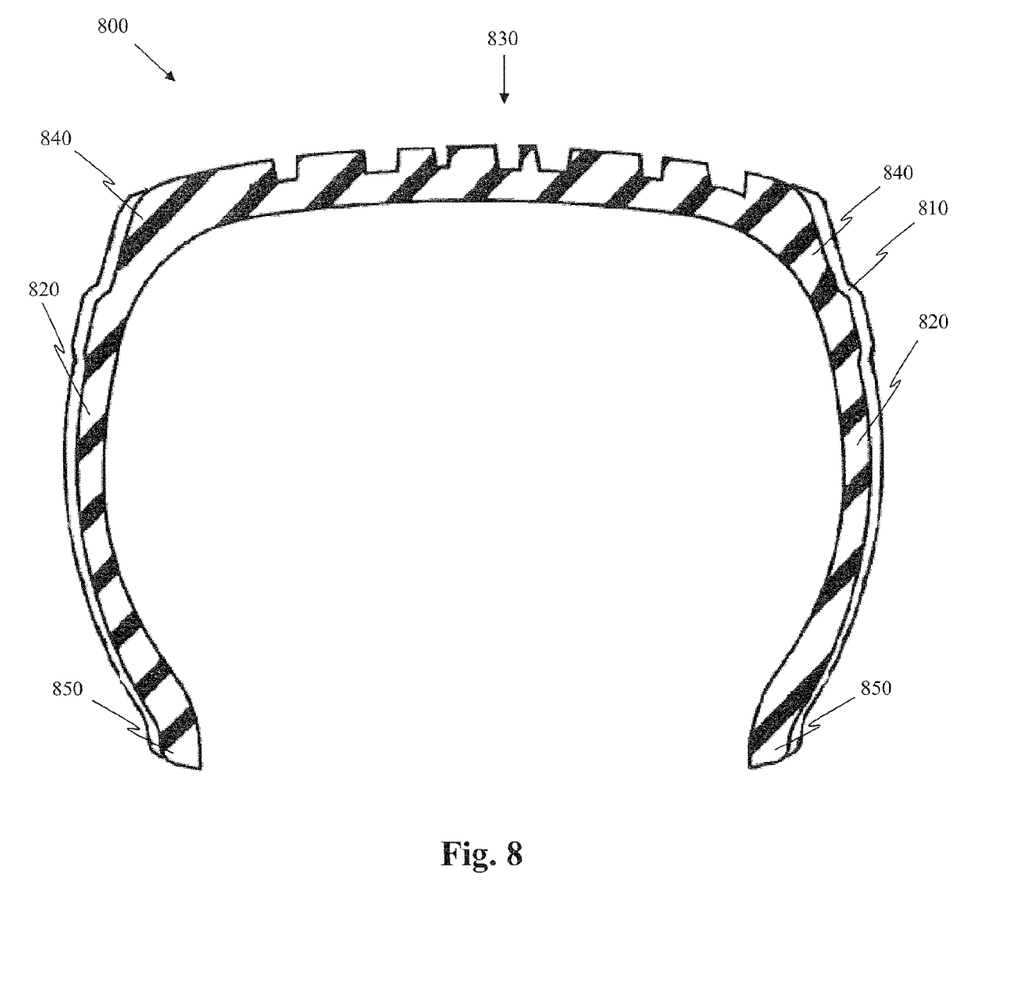
FIG. 8 is a cross-section of one embodiment of a tire having a laminate disposed on a pair of sidewalls.

FIG. 8 illustrates a cross-section of one embodiment of a tire 800 having laminates 810 disposed on a pair of sidewalls 820. In the illustrated embodiment, the laminate does not cover the circumferential tread 830 of the tire 800. Instead, the laminate 810 extends from a shoulder portion 840 of each sidewall 820 to the heel 850 of the tire 800. In alternative embodiments (not show), the laminate may only cover a portion of each sidewall. It should be understood that the coverage of each sidewall need not be the same. For example, the laminate may cover an outer sidewall of a tire, but not the inner sidewall of the tire.

In the above-described embodiments, the laminate may be rubber, or another polymeric material. In one known embodiment, the laminate and the base rubber of the circumferential tread have at least some of the same properties. For example, the laminate may have substantially the same modulus of elasticity or the same hardness as the base rubber. The laminate may also have substantially the same snow traction as the base rubber. The laminate may also have substantially the same wet traction as the base rubber. In one known embodiment, the laminate is constructed of the same material as the base rubber.

In an alternative embodiment, the laminate is constructed of a material that is harder than the base rubber of the tire. Such a laminate may be useful in agricultural tires, and tires for off-road vehicles. As is understood in the art, agricultural tires are susceptible to damage from corn stalks, rocks, and other hard objects Likewise, tires on off-road vehicles are susceptible to damage from rocks and other hard objects.

In another alternative embodiment, the laminate may have material properties that produce greater traction, making the laminate more suitable for an applications traction performance than the base rubber. In one such example, for snow traction, the laminate has a low modulus of elasticity, such that the laminate is softer than the base rubber. Such a laminate may perform better in cold weather, which hardens the rubber. Other traction performances could include, without limitation, dry, sand, wet, oil, and high temperature.

The laminate may also include sipes or cuts to provide additional traction. In one embodiment, the sipes may extend through the entire laminate without extending into the base rubber. In an alternative embodiment, the sipes may only extend partially through the laminate. In another alternative embodiment, the sipes may extend through the entire laminate and extend through part of the base rubber.

In the above-described embodiments, the base rubber of the tire may be suitable for all seasons. Accordingly, such a tire would have superior winter characteristics initially, when the top surface of the tread is covered by the laminate (such as shown in FIG. 3). When the tire is used, and the laminate wears off the top surface of the tread (such as shown in FIG. 4) then the base rubber is exposed, and the tire has all season performance thereafter. The thickness of such a laminate could be selected for various wear rates, so that the laminate lasts through the winter and is worn away by the spring.

In another example, the laminate is made of an ozone resistant material. Such a material would resist ozone cracking, and may be particularly useful in the grooves of a tread.

In still another example, the laminate is a sealant. Such an embodiment may be particularly useful for tires on mining vehicles. In yet another example, the laminate may have air permeability different from the base rubber.

In one embodiment, the use of a laminate on the tread of a tire enhances performance as the tire wears. For example, where a laminate is disposed on the top surface of the tread and in the grooves (such as shown in FIG. 3), the laminate on the top surface of the tread wears away during use of the tire, resulting in a tire having laminate only in the grooves of the tire (such as shown in FIG. 4). In one known embodiment, the laminate in the grooves is a soft material that improves snow performance.

In one known embodiment, the laminate does not include carbon black. In such an embodiment, the laminate may include pigments of any color or combination of colors. Colors may be employed for aesthetic reasons. For example, laminates may be colored to display a design, text, logos, brand names, or other pictures or photographs. A user may determine that it is aesthetically pleasing to have a color laminate that is disposed only in the grooves, or disposed on both the tread and the grooves. Multiple colors may be employed on a single laminate. For example, the laminate may have colors in a camouflage pattern. In one embodiment, a user may customize the tire by providing an image that is transferred to the laminate.

A colored laminate may also be employed for hygienic reasons. For example, in applications such as medical or food service, it may be desirable to maintain a clean working environment. A colored laminate may provide a visual indicator of dirt, dust, or other wanted material that may be masked by a black tire.

The color of the laminate may also be used as an indicator. The use of color as an indicator allows the tire to display the same information to an observer, regardless of whether the car is stopped or moving. For example, the color may be selected to indicate material properties of the laminate itself. Or the color may be selected to indicate a property of the tire. In one example, a blue laminate may be employed on a tire that has superior handling in wet conditions. In another example, a green laminate may be employed to indicate that the tire is fuel efficient, or otherwise environmentally friendly.

A color laminate may also function as a wear indicator. When the laminate is a different color than the base rubber, the exposure of the base rubber provides a visual indication of the level of wear of the tire.

Additionally, the color may be used to identify a brand. For example, a tire brand may be associated with a particular color. Additionally, a car brand, car rental service brand, commercial vehicle brand, or non-vehicular service or product may be associated with a particular color.

When the laminate has material properties more suitable for snow performance than the base rubber, the laminate may have a different color than the base rubber. The use of different colors would provide an indicator that the laminate has worn away from the top surface of a tire tread. Multiple layers of different colors may also be employed to indicate multiple levels of wear. Alternatively, the laminate may have the same color than the base rubber to provide a uniform appearance.

In one known embodiment, the laminate is an uncured, or "green" compound that is applied to a cured, or vulcanized tire. The tire may be a new tire, or a used tire. In the case of a used tire, the laminate may be applied to the entire tread or only to those portions of the tread that are worn.

Figure 9:
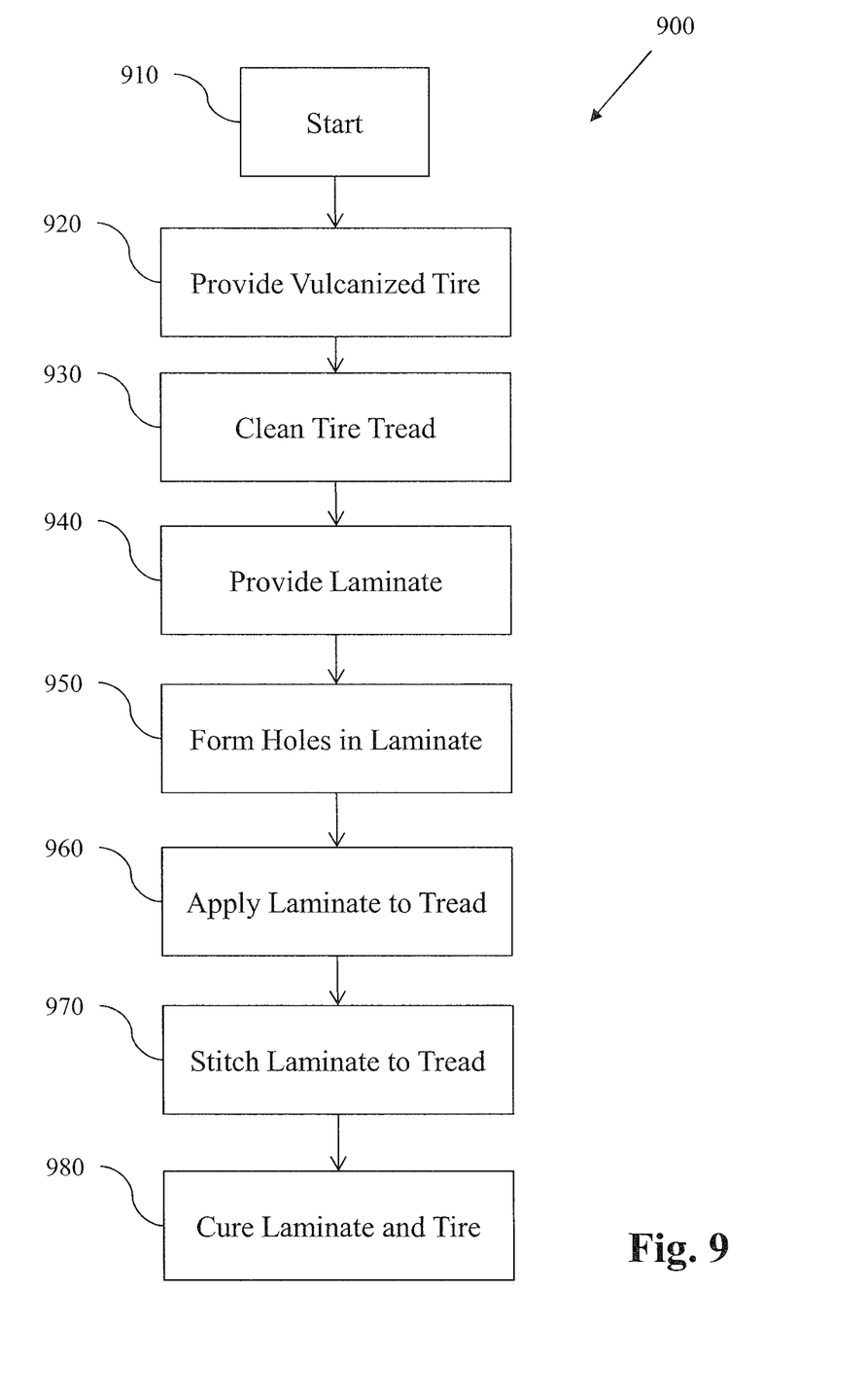
FIG. 9 is a flow chart illustrating one embodiment of a method of applying a laminate to a tire.

FIG. 9 is a flow chart illustrating an exemplary method 900 of applying a laminate to a tire. At the beginning 910 of the method, a vulcanized tire is provided (920). The tire may include a plurality of tread elements, such as ribs, block, or lugs, separated by grooves, slots, or other voids. The tire may also include sipes.

The tread of the tire is cleaned (930) to prevent any extraneous material from being captured between the tire tread and the laminate. In one embodiment (not shown), the tread is also ground to provide a roughened surface for receiving the laminate. The grinding may be performed by abrasion blasting (i.e., sandblasting). In the case of a new tire, the cleaning and grinding steps may be reduced.

After the tire is adequately prepared, a laminate is provided (940). In one embodiment, holes are formed in the laminate. For example, the laminate may be punctured in a plurality of locations. Holes in the laminate prevent air from becoming trapped between the tire tread and the laminate. However, it should be understood that the step of forming holes in the laminate may be omitted. In such instances, air may be evacuated from between the laminate and the tire tread by a vacuum, or by applying pressure to force air out along the sides of the laminate.

The laminate is then applied to the tire (960) in a desired manner. For example, the laminate may be applied to any of the portions of the tire shown in FIGS. 1-8 and described above. In one embodiment, the laminate is a sheet of material that is pressed onto the tread. In an alternative embodiment, the laminate is a strip of material that is wound about the tread. In another alternative embodiment, the laminate includes a plurality of precut shapes that are applied to the tread. In yet another embodiment, the laminate is applied with a cushion extruder. In still another embodiment, the laminate is provided in a liquid form and is applied with a spray or a bath.

After the laminate is applied to the tread, pressure may be applied to the laminate (970). The application of pressure to the laminate may be referred to as "stitching." Stitching the laminate to the tread may also aid in evacuating air that may otherwise be trapped between the tread and the laminate. In one embodiment, the stitching may be performed by a roller having projections that create holes in the laminate.

The tire and laminate are then heated (980) until the laminate is cured. In one embodiment, the heating occurs in a vacuum bag. Because the tire has previously been cured, the curing step may be performed with a lower heat or for a shorter amount of time than would be expected for curing a green tire. It should be understood that the material and thickness of the laminate are factors that should be considered in determining the temperature and time for curing. For example, depending on the material, thickness, and other factors, the tire and laminate may be cured at a temperature of 100°-200°. Additionally, the time for curing the tire and laminate may range from 15 seconds or less, to more than 2 hours.

After the laminate has been applied to the tire, sipes may optionally be cut into the laminate. For example, sipes may be cut at the same location as sipes in the base rubber. Alternatively, where sipes are present on the base rubber, the laminate may conform to the shape of the underlying base rubber during the curing process.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of applying a laminate to a cured tire, the method comprising:
   providing a cured tire having a circumferential tread constructed of a base material, wherein the circumferential tread has a plurality of tread elements, each of the plurality of tread elements having a top surface and a plurality of side surfaces, and wherein the circumferential tread further has a plurality of grooves disposed between the plurality of tread elements;
   providing an uncured laminate;
   puncturing the uncured laminate to form a plurality of holes in the uncured laminate;
   placing the uncured laminate about the circumferential tread of the cured tire, such that the uncured laminate covers at least some of the plurality of tread elements and at least some of the plurality of grooves, wherein the laminate has greater snow traction than the base material;
   stitching the uncured laminate to the cured tire by applying pressure to the uncured laminate;
   buffing off the uncured laminate from a top surface of the plurality of tread elements; and
   heating the uncured laminate and the cured tire.

2. The method of claim 1, further comprising cleaning the circumferential tread of the cured tire prior to wrapping the uncured laminate about the circumferential tread.

3. The method of claim 1, wherein the cured tire is a new tire.

4. The method of claim 1, wherein the cured tire is a used tire.

5. The method of claim 1, wherein the laminate has substantially the same modulus of elasticity as the base material.

6. The method of claim 1, wherein the heating the uncured laminate is performed in a vacuum bag.

7. The method of claim 1, wherein the uncured laminate is a sheet of uncured laminate.

8. The method of claim 1, wherein the stitching is performed by a roller having projections that create holes in the uncured laminate.

9. The method of claim 1, wherein the heating of the uncured laminate and the cured tire includes heating the uncured laminate and the cured tire at a temperature of 100°-200° C.

10. A method of laminating a vulcanized tire comprising:
    providing a vulcanized tire having a circumferential tread with a plurality of grooves, and a pair of sidewalls constructed of a base rubber;
    cleaning the circumferential tread;
    providing a laminate;
    forming a plurality of holes in the laminate;
    applying the laminate to at least a portion of one of the circumferential tread and at least one of the grooves of the vulcanized tire;
    applying pressure to the laminate, thereby evacuating air between the laminate and the circumferential tread of the vulcanized tire;
    grinding away the laminate from a top surface of the plurality of tread elements; and
    curing the laminate.

11. The method of claim 10, wherein the laminate has substantially the same modulus of elasticity as the base rubber.

12. The method of claim 11, wherein the laminate has greater snow traction than the base rubber.

13. The method of claim 10, wherein the curing the laminate is performed in a vacuum bag.

14. The method of claim 10, wherein the laminate is a sheet of laminate.

15. The method of claim 10, wherein the laminate is applied to the circumferential tread of the vulcanized tire with a cushion extruder.

16. The method of claim 10, wherein the laminate is an uncured laminate.

17. The method of claim 10, wherein the step of applying pressure to the laminate includes using a roller to apply pressure to the laminate.

18. The method of claim 17, wherein the roller has projections that create holes in the laminate.

19. The method of claim 10, wherein the curing of the laminate includes curing the laminate at a temperature of 100°-200° C.

* * * * *